United States Patent Office 2,800,520
Patented July 23, 1957

2,800,520

PRIMARY CELL DEPOLARIZER

Leslie D. McGraw, Columbus, Ohio, assignor to the United States of America as represented by the Secretary of the Army No Drawing. Application February 7, 1956,
Serial No. 564,091

5 Claims. (Cl. 136—102)

This invention relates to a new cathode depolarizer for electric primary cells.

It has been found that alkaline earth ferrates may be advantageously used as cathode depolarizers for electric primary cells having an alkaline electrolyte comprising an aqueous solution of an alkali metal hydroxide and an alkali metal pyrophosphate. The pyrophosphate is necessary to serve as a sequestering agent for trivalent iron which is formed by reduction of the alkaline earth ferrate depolarizer.

Any metal which may normally be used as the anode together with an alkaline electrolyte is suitable to be used as the anode with the cathode depolarizer of the present invention. Zinc and tin may, for example, be used as anoding materials with barium ferrate as the cathodic material in the presence of an alkaline electrolyte. Zinc is preferred as it stands higher in the electromotive series. No appreciable decomposition of the anodic material takes place when the cell is not in use.

According to a preferred embodiment barium ferrate is used as the depolarizer material with an alkaline electrolyte comprising an aqueous solution of about 20 to 40 percent potassium hydroxide and 10 to 20 percent potassium pyrophosphate. Higher concentrations up to the saturation point and concentrations lower than those mentioned may be used. Sodium hydroxide and sodium pyrophosphate may be substituted for the corresponding potassium compounds. While the alkali metal pyrophosphates are particularly advantageous for the purpose of the present invention, other sequestering agents which are operative in alkaline solution may also be used.

In order to impart to the cathodic depolarizer material the necessary electronic conductivity, the alkaline earth ferrate is mixed in a well known manner with inert conductive materials such as carbon, graphite, etc. Preferably equal amounts of carbon black and alkaline earth ferrates are mixed together. A cathode mix produced by mixing 4 grams of Shawinigan acetylene black with 4 grams of barium ferrate occupies a volume of about 15 cc. A primary cell having zinc as the anode, the above described mix as the depolarizer cathode, and an aqueous electrolyte containing about 10 percent potassium hydroxide and about 40 percent potassium pyrophosphate ($K_4P_2O_7.3H_2O$) was found to have a discharge potential of 1.0 volt at 220 milliampere.

The new cathode is particularly suited for cells of the deferred action type. A few days after the battery has been activated with the electrolyte, the barium ferrate is decomposed to a considerable extent. The decomposition is faster in acid solution and therefore acidic electrolytes may not be used.

The open circuit voltage of this cell with a zinc electrode is 1.6 volts. The discharge voltage is somewhat lower, and depends on the discharge rate. Voltages from about 1 to about 1.3 are typical.

It will be obvious to those skilled in the art that many modifications and variations other than those described are practicable within the scope of the present invention as defined in the following claims.

What is claimed is:

1. A primary cell comprising an anode, an alkaline earth ferrate depolarizer-cathode and an alkaline electrolyte containing a sequestering agent for removing trivalent iron formed by reduction of the alkaline earth ferrate depolarizer.

2. A primary cell comprising an anode, a barium ferrate depolarizer-cathode and an alkaline electrolyte containing a sequestering agent for removing trivalent iron formed by reduction of the barium ferrate depolarizer.

3. A primary cell according to claim 2 in which the electrolyte contains potassium hydroxide.

4. A primary cell according to claim 2 in which the sequestering agent consists of an alkali metal pyrophosphate.

5. A primary cell comprising a zinc anode, a barium ferrate cathode and an electrolyte consisting of an aqueous solution containing 20 to 40 percent potassium hydroxide and 10 to 20 percent of potassium pyrophosphate.

References Cited in the file of this patent

Mellor, J. W.: "A Comprehensive Treatise on Inorganic and Theoretical Chemistry," Longmans, Green and Co., London, 1947, vol. XIII, pp. 934–935.